(12) United States Patent
Onose et al.

(10) Patent No.: US 6,612,038 B2
(45) Date of Patent: Sep. 2, 2003

(54) PORTABLE CIRCULAR SAW

(75) Inventors: Akira Onose, Hitachinaka (JP);
Kihachirou Matsumoto, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/899,230

(22) Filed: Jul. 6, 2001

(65) Prior Publication Data

US 2002/0002774 A1 Jan. 10, 2002

(30) Foreign Application Priority Data

Jul. 7, 2000 (JP) ........................................ 2000-206671

(51) Int. Cl.[7] .............................................. B23D 45/16
(52) U.S. Cl. .............................. 30/391; 30/390; 30/124
(58) Field of Search .......................... 30/124, 390, 391, 30/388, 389; 144/252.1

(56) References Cited

U.S. PATENT DOCUMENTS

| | | | | |
|---|---|---|---|---|
| 3,662,796 A | * | 5/1972 | Batistelli | 30/124 |
| 5,327,649 A | * | 7/1994 | Skinner | 30/124 |
| 5,537,748 A | * | 7/1996 | Takahashi et al. | 30/124 |
| 6,269,543 B1 | * | 8/2001 | Ohkouchi | 30/391 |
| 6,308,424 B1 | * | 10/2001 | Stielper | 30/391 |

* cited by examiner

*Primary Examiner*—Hwei-Siu Payer
(74) *Attorney, Agent, or Firm*—McDermott, Will & Emery

(57) ABSTRACT

A portable circular saw includes a base. A saw blade has a portion projecting downward from the base. A saw-blade cover conceals at least a part of the saw blade. A projection provided on the saw-blade cover protrudes in a direction away from the saw blade. The projection has a lower surface extending across a first plane which is parallel to an axis of rotation of the saw blade, and which contains a tangent to an outer circumference of the saw-blade at a point of intersection with a second plane including a lower surface of the base. Chips fly from the point of intersection along a direction in the first plane. The lower surface of the projection inclines relative to a line perpendicular to the tangent so as to change a path of a portion of flow of the chips toward a forward side as viewed in a cutting direction.

11 Claims, 8 Drawing Sheets

PORTABLE CIRCULAR SAW

BACKGROUND OF THE INVENTION

1. Field of the Invention

This invention relates to a portable circular saw.

2. Description of the Related Art

When a portable circular saw is cutting a workpiece, there occur chips flying. Generally, as viewed in a cutting direction, a front portion of a saw blade is a source of generating chips. It is known to provide a cover for a front portion of a saw blade to prevent an operator (a user) from being exposed to flying chips.

At least a portion of a typical saw-blade cover is made of a transparent member. The transparent cover portion enables an operator to observe a saw blade and an upper surface of a workpiece. Chips deposited on the inner surface of the transparent cover portion hinder the operator's observation. When chips collide against the transparent cover portion, scars tend to be caused on the inner surface of the transparent cover portion. Also, the scars hinder the operator's observation.

As will be explained later, a prior-art portable circular saw is poor in ability to prevent an operator from being exposed to flying chips, and in ability to enable chips to smoothly flow in a saw-blade cover.

SUMMARY OF THE INVENTION

It is a first object of this invention to provide a portable circular saw which is good in ability to prevent an operator (a user) from being exposed to flying chips.

It is a second object of this invention to provide a portable circular saw which is good in ability to enable chips to smoothly flow in a saw-blade cover.

A first aspect of this invention provides a portable circular saw comprising a base; a saw blade having a portion projecting downward from the base; a saw-blade cover concealing at least a part of the saw blade; and a projection provided on the saw-blade cover and protruding in a direction away from the saw blade, wherein the projection has a lower surface extending across a first plane which is parallel to an axis of rotation of the saw blade, and which contains a tangent to an outer circumference of the saw-blade at a point of intersection with a second plane including a lower surface of the base, and wherein chips fly from the point of intersection along a direction in the first plane, and the lower surface of the projection inclines relative to a line perpendicular to the tangent so as to change a path of a portion of flow of the chips toward a forward side as viewed in a cutting direction.

A second aspect of this invention provides a portable circular saw comprising a base; a saw blade having a portion projecting downward from the base; a saw-blade cover concealing at least a part of the saw blade; a movable slide cover provided on the saw-blade cover, and blocking and unblocking an opening between a front lower end of the saw-blade cover and an upper surface of the base in accordance with upward and downward movement thereof; and a projection provided on the slide cover and protruding in a direction away from the saw blade, wherein the projection has a lower surface extending across a first plane which is parallel to an axis of rotation of the saw blade, and which contains a tangent to an outer circumference of the saw-blade at a point of intersection with a second plane including a lower surface of the base, and wherein chips fly from the point of intersection along a direction in the first plane, and the lower surface of the projection inclines relative to a line perpendicular to the tangent so as to change a path of a portion of flow of the chips toward a forward side as viewed in a cutting direction.

A third aspect of this invention is based on the second aspect thereof, and provides a portable circular saw wherein when the slide cover is in its uppermost position, the projection protrudes from a line connecting a cutting point on the saw blade and a side surface portion of the saw-blade cover in a direction away from the saw blade.

A fourth aspect of this invention is based on the second aspect thereof, and provides a portable circular saw wherein the slide cover is transparent.

A fifth aspect of this invention is based on the second aspect thereof, and provides a portable circular saw wherein the projection extends substantially in parallel with a longitudinal direction of the base.

A sixth aspect of this invention is based on the second aspect thereof, and provides a portable circular saw wherein the projection is provided on a lower end of the slide cover.

A seventh aspect of this invention is based on the second aspect thereof, and provides a portable circular saw wherein a plane including a lower surface of the projection extends across the outer circumference of the saw blade.

An eighth aspect of this invention provides a portable circular saw comprising a base; a saw blade having a portion projecting downward from the base; a saw-blade cover concealing at least a part of the saw blade; a movable slide cover provided on the saw-blade cover, and blocking and unblocking an opening between a front lower end of the saw-blade cover and an upper surface of the base in accordance with upward and downward movement thereof; and a projection provided on and extending inside the slide cover, the projection protruding toward the saw blade.

A ninth aspect of this invention is based on the eighth aspect thereof, and provides a portable circular saw wherein a plane including a lower surface of the projection meets an outer circumference of the saw blade.

A tenth aspect of this invention is based on the eighth aspect thereof, and provides a portable circular saw wherein the slide cover assumes its uppermost position when the projection contacts a lower end of the saw-blade cover.

An eleventh aspect of this invention provides a portable circular saw comprising a saw blade; a saw-blade cover concealing at least a part of the saw blade; a movable slide cover provided on the saw-blade cover; and a flange-like outer projection provided on the slide cover to prevent chips from flying upward out of the slide cover.

A twelfth aspect of this invention provides a portable circular saw comprising a saw blade; a saw-blade cover concealing at least a part of the saw blade; a movable slide cover provided on the saw-blade cover; and a flange-like inner projection provided on the slide cover to reduce an effective cross-sectional area of a path for a flow of chips in the saw-blade cover.

DETAILED DESCRIPTION OF THE INVENTION

A prior-art portable circular saw will be explained below for a better understanding of this invention.

Figure 1:
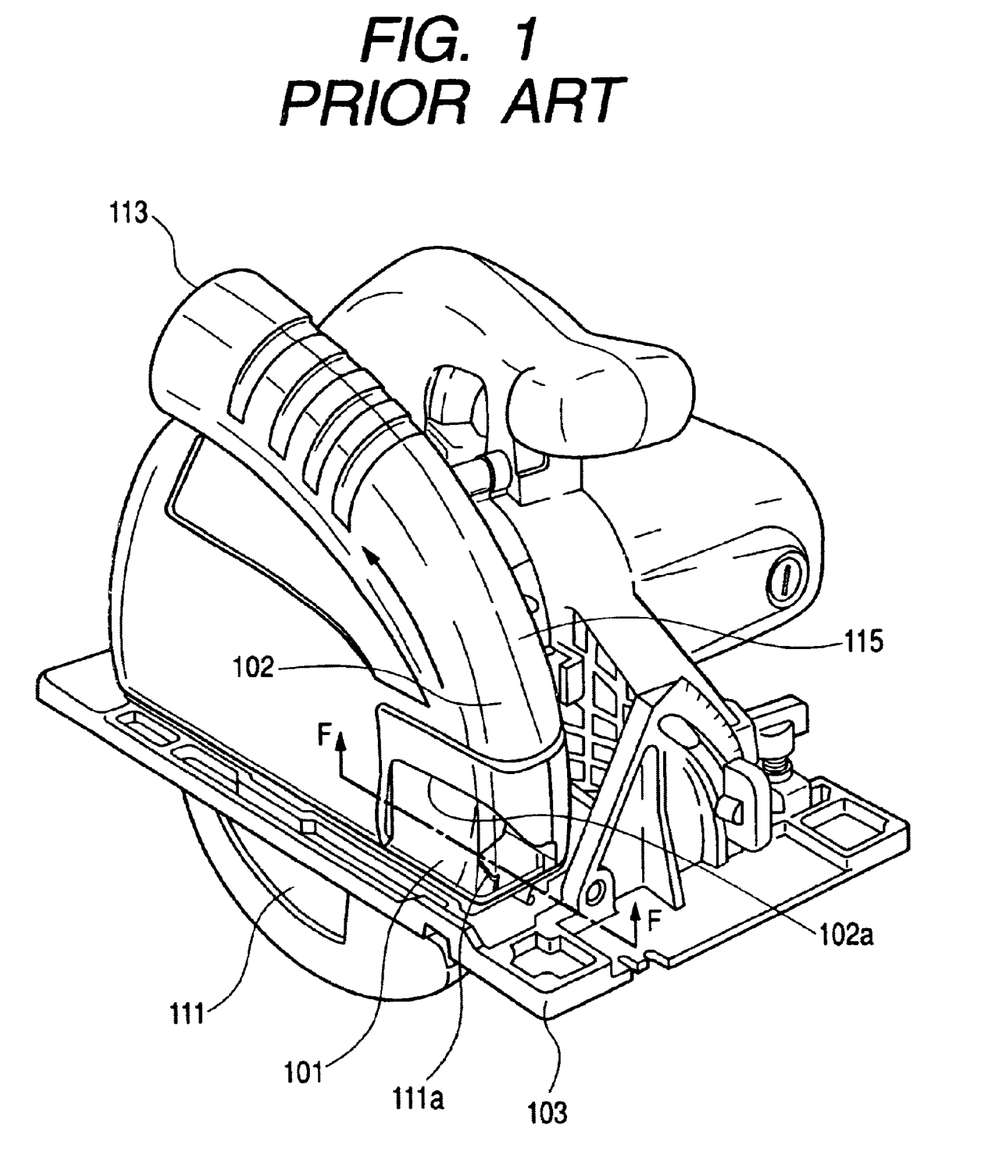
FIG. 1 is a perspective view of a prior-art portable circular saw.

FIG. 1 shows a prior-art portable circular saw. As shown in FIG. 1, the prior-art portable circular saw includes a saw-blade cover 102 having a front portion as viewed in a cutting direction. The prior-art portable circular saw has a body provided with a base 103. There is a spacing or an opening between the lower end 102a of the front portion of the saw-blade cover 102 and the upper surface of the base 103. A slide cover 101 made of transparent resin is provided on the saw-blade cover 102. The slide cover 101 can move upward and downward relative to the saw-blade cover 102. Specifically, the slide cover 101 can move between a closed position and an open position corresponding to a lowermost position and an uppermost position respectively. The slide cover 101 blocks the opening between the lower end 102a of the front portion of the saw-blade cover 102 and the upper surface of the base 103 when assuming its closed position (its lowermost position). The slide cover 101 unblocks the opening when assuming its open position (its uppermost position).

A saw blade 111 has a front portion 111a as viewed in the cutting direction. When the slide cover 101 is in its closed position (its lowermost position), the saw-blade front portion 111a is covered thereby so that flying chips are prevented from reaching an operator (a user). When the slide cover 101 is in its open position (its uppermost position), the operator can directly observe the saw-blade front portion 111a and the upper surface of a workpiece (not shown).

Figure 2:
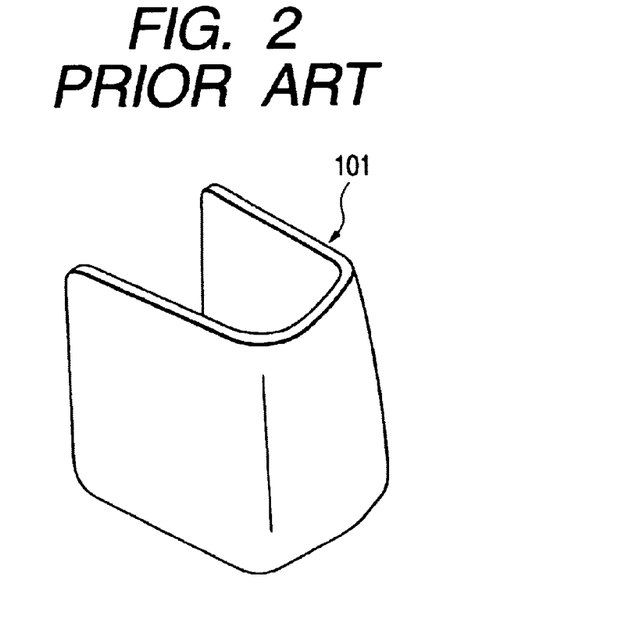
FIG. 2 is a perspective view of a slide cover in FIG. 1.
Figure 3:
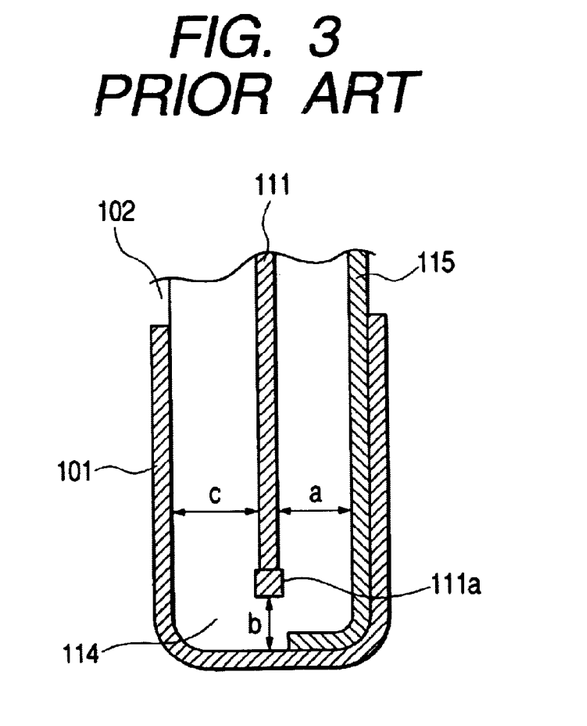
FIG. 3 is a sectional view of a portion of the prior-art portable circular saw which is taken along the line F—F in FIG. 1.

As shown in FIGS. 2 and 3, the slide cover 101 has a U-shaped cross-section. The slide cover 101 movably fits on the saw-blade cover 102. The slide cover 101 holds on to the saw-blade cover 102 by its own resilience.

When the slide cover 101 is in its open position (its uppermost position), the operator may be exposed to flying chips although the operator can directly observe the saw-blade front portion 111a and an upper surface of a workpiece.

As shown in FIG. 1, the saw-blade cover 102 has an outlet 113 for chips. It is desirable that chips smoothly and swiftly flow in the saw-blade cover 102 toward the outlet 113. The speed of chips in the saw-blade cover 102 is determined by the rotational speed of the saw blade 111 and the cross-sectional area of a chips-inflow portion 114 of the saw-blade cover 102 (see FIG. 3). Chips flow less smoothly in the saw-blade cover 102 as the cross-sectional area of the chips-inflow portion 114 increases. The cross-sectional area of the chips-inflow portion 114 is determined by distances "a", "b", and "c" (see FIG. 3). When the slide cover 101 is in its closed position, the distance "a" is defined between a first side surface of the saw blade 111 and a side surface of a gear cover 115. In addition, the distance "b" is defined between an edge of the saw-blade front portion 111a and an inner bottom surface of the slide cover 101. Furthermore, the distance "c" is defined between a second side surface of the saw blade 111 and an inner side surface of the slide cover 101.

The slide cover 101 fits on outer surfaces of the saw-blade cover 102. Therefore, the distances "b" and "c" between the saw blade 111 and the slide cover 101 are relatively great, and the cross-sectional area of the chips-inflow portion 114 is considerably large. Thus, it tends to be difficult for chips to smoothly flow in the saw-blade cover 102.

First Embodiment

With reference to FIGS. 4–7, a portable circular saw of a first embodiment of this invention has a body provided with a cover 2 for a saw blade 11. A motor (not shown) is housed and supported by the body. The saw blade 11 is connected with the output shaft of the motor. The saw blade 11 can be rotated by the motor. The saw blade 11 has a circular shape or a disk shape.

The saw-blade cover 2 conceals at least a part of the saw blade 11. The body of the portable circular saw is provided with a base 3. The saw-blade cover 2 is located above the base 3. The base 3 has an opening through which the saw blade 11 extends. A part of the saw blade 11 projects downward from the lower surface of the base 3. During a cutting process, the base 3 is pressed against the upper surface of a workpiece. The base 3 may be rotatable relative to the other portions of the body of the portable circular saw.

The body of the portable circular saw is further provided with a gear cover extending above the base 3. The gear cover is located in one side of the saw blade 11. At least a part of the other side of the saw blade 11 is concealed by the saw-blade cover 2. The gear cover and the saw-blade cover 2 face or oppose each other.

The saw-blade cover 2 has a front portion as viewed in a cutting direction. There is a spacing or an opening between the lower end 2a of the front portion of the saw-blade cover 2 and the upper surface of the base 3. A slide cover 1 at least partially made of transparent resin is provided on the saw-blade cover 2. The slide cover 1 can move upward and downward relative to the saw-blade cover 2. Specifically, the slide cover 1 can move between a closed position and an open position corresponding to a lowermost position and an uppermost position respectively. The slide cover 1 blocks the opening between the lower end 2a of the front portion of the saw-blade cover 2 and the upper surface of the base 3 when assuming its closed position (its lowermost position). The slide cover 1 unblocks the opening when assuming its open position (its uppermost position).

The slide cover 1 has an elongated hole or a slot 5 extending vertically with respect to the body of the portable circular saw. The saw-blade cover 2 has a projection 4 (see FIG. 7) slidably fitting into the slot 5. The saw-blade cover 2 has a side surface 6 in contact with a side surface 7 (see FIG. 5) of the slide cover 1. It should be noted that the side surface 6 of the saw-blade cover 2 is a front surface as viewed in the cutting direction. The combination of the projection 4 and the slot 5, and the contact between the side surfaces 6 and 7 provide a guide for upward and downward movement of the slide cover 1 relative to the saw-blade cover 2. During the upward and downward movement of the slide cover 1, the projection 4 moves along the slot 5 and the side surface 7 slides on the side surface 6.

Figure 7:
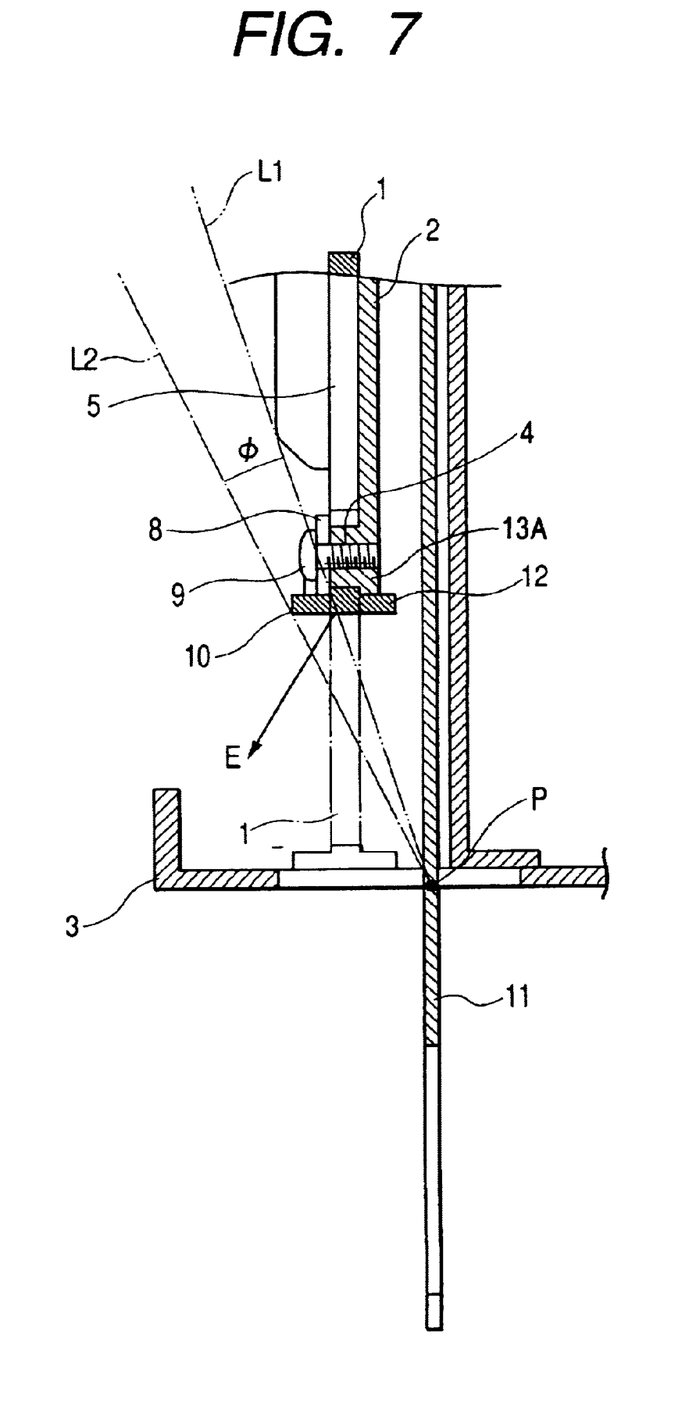
FIG. 7 is a sectional view of a portion of the portable circular saw which is taken along the arrow A in FIG. 4.

As best shown in FIG. 7, the projection 4 on the saw-blade cover 2 has a threaded hole. A screw 9 extends into the threaded hole in the projection 4. The screw 9 meshes with the inner threaded surfaces of the projection 4. A head-side portion of the screw 9 projects from the slot 5 in the slide cover 1. A washer 8 is provided between the slide cover 1 and the head of the screw 9. The slide cover 1 is connected with and supported on the saw-blade cover 2 by the screw 9 and the washer 8.

Figure 6:
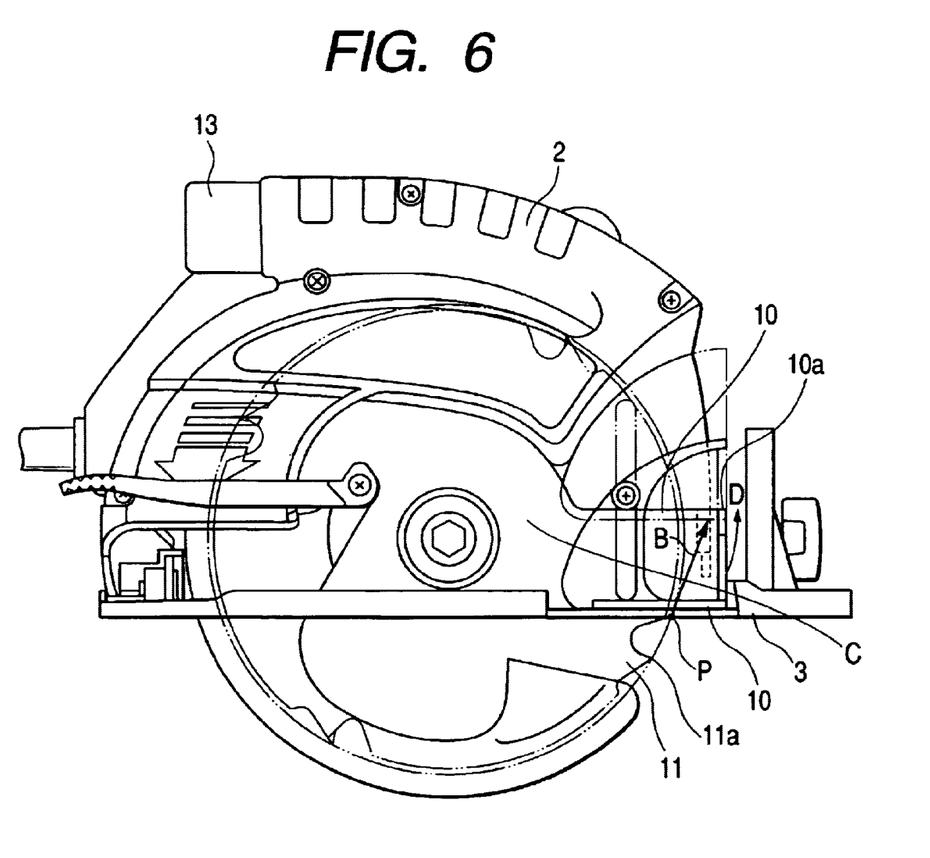
FIG. 6 is a front view of the portable circular saw in FIG. 4.

It is presumed that during the cutting process, chips fly in directions centered at an upward direction along a tangent B to the outer circumference of the saw blade 11 at the point P of intersection with a plane including the lower surface or the bottom surface of the base 3 (see FIGS. 6 and 7). During the cutting process, the intersection point P coincides with a cutting point.

Figure 4:
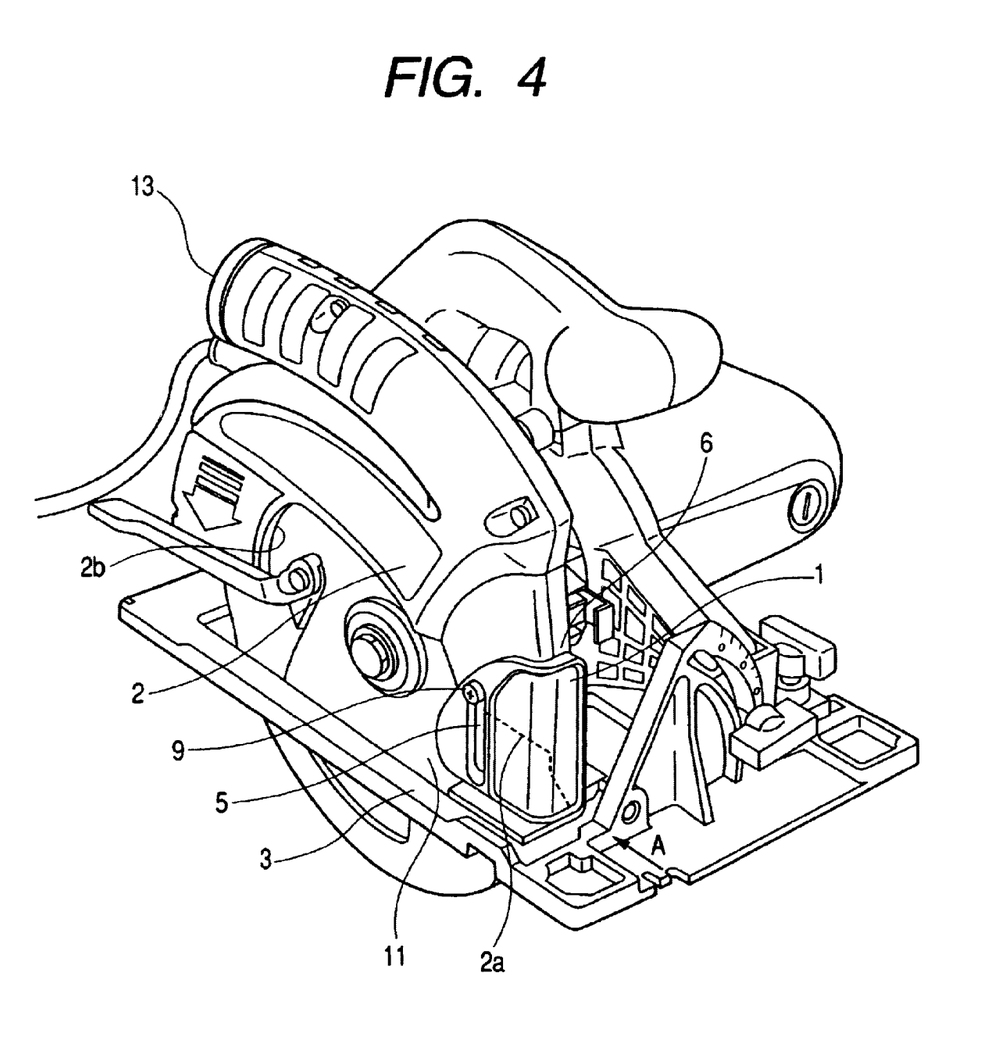
FIG. 4 is a perspective view of a portable circular saw according to a first embodiment of this invention.
Figure 5:
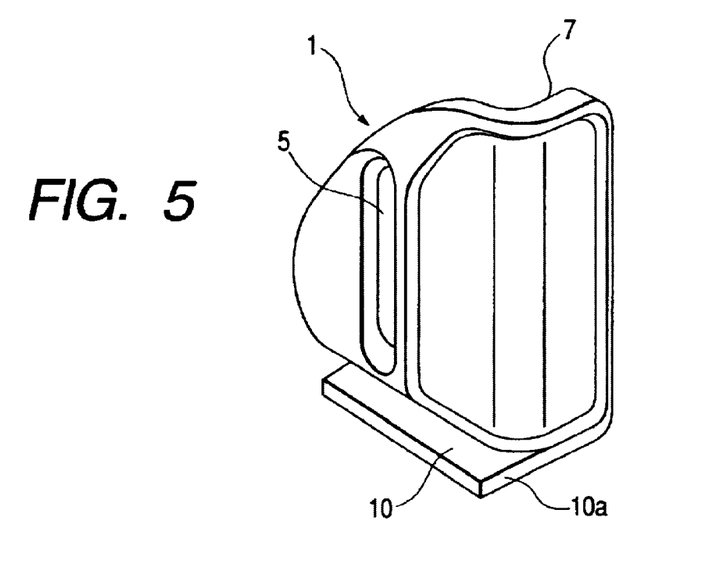
FIG. 5 is a perspective view of a slide cover in FIG. 4.

As best shown in FIGS. 4 and 5, the lower end of an outer portion of the slide cover 1 has a flange-like projection (an outer projection) 10 extending along a direction away from the saw blade 11. In FIG. 6, the outer projection 10 is located above the point P of intersection between the outer circumference of the saw blade 11 and the plane including the lower surface of the base 3 even when the slide cover 1 is in its lowermost position. The outer projection 10 may be located substantially at or immediately above the intersection point P when the slide cover 1 is in its lowermost position. In FIG. 6, regardless of the position of the slide cover 1 between its uppermost position and the lowermost position, a plane including a lower surface of the outer projection 10 covers a range through which the tangent B passes. Thus, in FIG. 6, the plane including the lower surface of the outer projection 10 meets or extends across the tangent B. The outer projection 10 extends along a direction roughly similar to the direction of a line C perpendicular to the tangent B. The outer projection 10 has a front portion 10a as viewed in the cutting direction. Preferably, the outer projection 10 has a shape such that when the slide cover 1 is in its uppermost position, the front portion 10a thereof is positioned relative to the line C in a direction D (see FIG. 6) away from the base 3. Preferably, the outer projection 10 extends substantially in parallel with the longitudinal direction of the base 3. Thus, the outer projection 10 extends in a direction inclined relative to the line C at a given counterclockwise offset angle.

During the cutting process, the cutting point coincides with the point P of intersection between the outer circumference of the saw blade 11 and the plane including the lower surface of the base 3. Chips (outwardly-directed chips) flying from the cutting point P in upward directions toward a given range outside the slide cover 1 meet the outer projection 10 of the slide cover 1 before being rebounded therefrom and moving forward and downward as viewed in the cutting direction. As previously mentioned, the outer projection 10 extends in parallel with the base 3, and inclines relative to the line C at the given counterclockwise offset angle. Therefore, the outer projection 10 prevents outwardly-directed chips from flying upward and rearward as viewed in the cutting direction. Accordingly, chips are more reliably prevented from reaching an operator (a user) normally in the rear of the cutting point P.

In FIG. 6, the plane including the lower surface of the outer projection 10 extends across the outer circumference of the saw blade 11 and above the intersection point (the cutting point) P. Accordingly, outwardly-directed chips flying from a point above the cutting point P also meet the outer projection 10 before being rebounded therefrom and moving forward and downward as viewed in the cutting direction. Thus, these chips are also prevented from reaching the operator. In FIG. 6, while the slide cover 1 is moved between its uppermost position and its lowermost position, the plane including the lower surface of the outer projection 10 remains across the outer circumference of the saw blade 11.

In FIG. 7, a line L1 is formed by connecting the intersection point P and a point on the outer and lower side edge of the saw-blade cover 2 which is remote from the saw blade 11. When the slide cover 1 is in its uppermost position, the outer projection 10 extends from the line L1 in a direction away from the saw blade 11. In this case, a line L2 connecting the intersection point P and a point on the edge of the outer projection 10 which is remote from the saw blade 11 deviates from the line L1 by a given angle φ. Therefore, the outer projection 10 increases the degree of preventing chips from flying upward out of the slide cover 1 and the saw-blade cover 2 by a value corresponding to the given angle φ. Chips meeting the lower surface of the outer projection 10 are rebounded therefrom, and falling in an obliquely downward direction E. Accordingly, the chips are prevented from reaching the operator.

The outer projection 10 is provided on the lower end of the slide cover 1. When the slide cover 1 is in its lowermost position, the outer projection 10 contacts the upper surface of the base 3. This design further prevents chips from flying upward out of the slide cover 1. Pressing the outer projection 10 by operator's finger enables the slide cover 1 to be easily moved upward and downward (especially, downward).

As previously mentioned, the outer projection 10 provided on the slide cover 1 protrudes in the direction away from the saw blade 11. The outer projection 10 has a lower surface extending across a first plane which is parallel to an axis of rotation of the saw blade 11, and which contains the tangent B to the outer circumference of the saw blade 11 at the point P of intersection with a second plane including the lower surface of the base 3. During the cutting process, chips fly from the intersection point (that is, the cutting point) P in upward directions in the first plane. The lower surface of the outer projection 10 inclines relative to the line C perpendicular to the tangent B so as to change a path of a portion of flow of the chips toward a forward side as viewed in the cutting direction. In FIG. 7, upwardly and outwardly flying ones among the chips meet the lower surface of the outer projection 10 and are rebounded therefrom, being turned to the obliquely downward direction E and being directed toward a forward side as viewed along the cutting direction. Accordingly, the chips are prevented from reaching the operator.

The saw-blade cover 2 has an outlet 13 for chips. During the cutting process, normally-directed flying chips flow in the saw-blade cover 2 toward the outlet 13 before being discharged therefrom. The speed of chips in the saw-blade cover 2 is determined by the rotational speed of the saw blade 11 and the cross-sectional area of a chips-inflow portion in the saw-blade cover 2. Chips flow faster and smoother in the saw-blade cover 2 as the cross-sectional area of the chips-inflow portion decreases.

Figure 8:
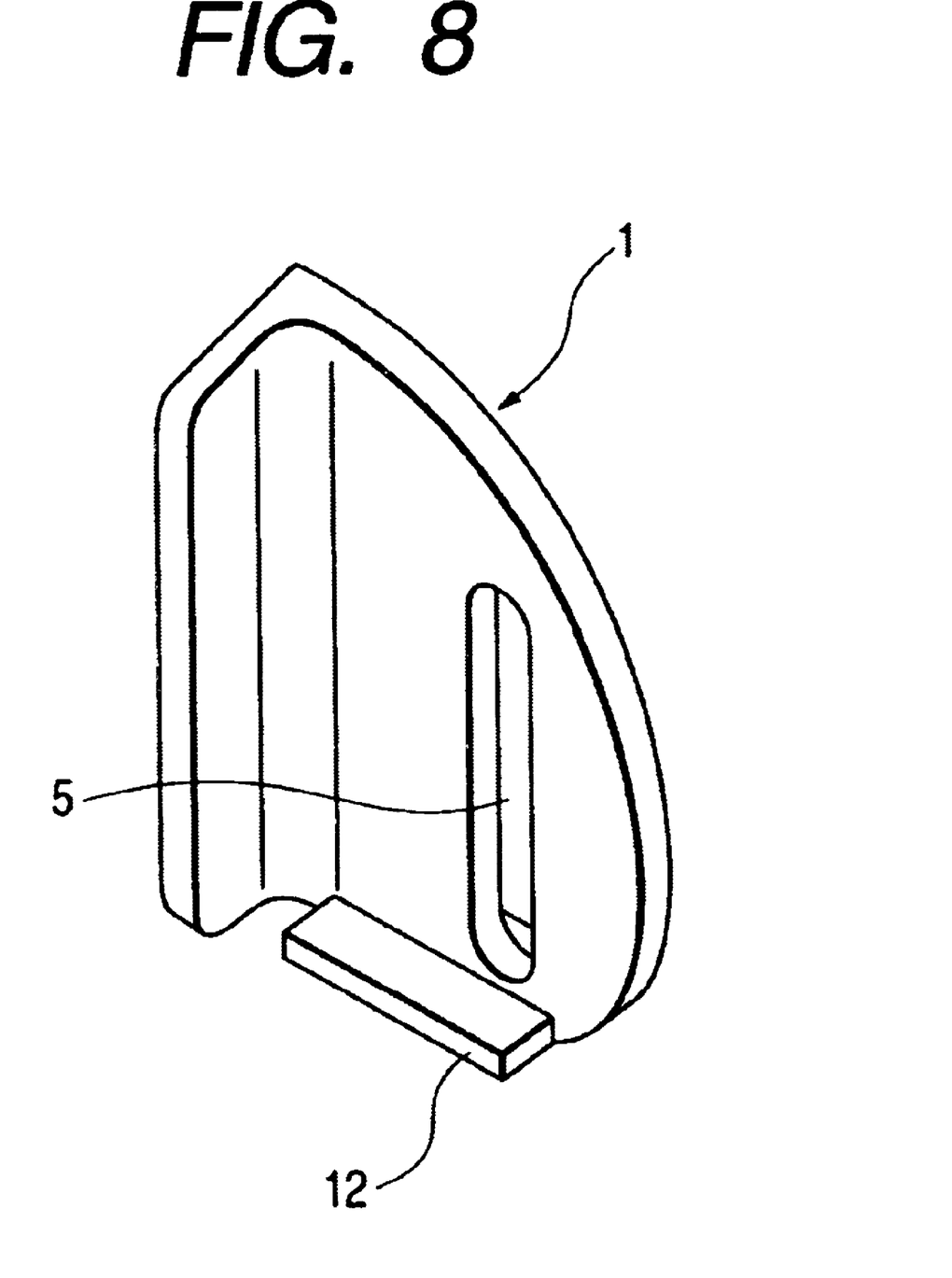
FIG. 8 is a perspective view of the slide cover in FIG. 7.
Figure 9:
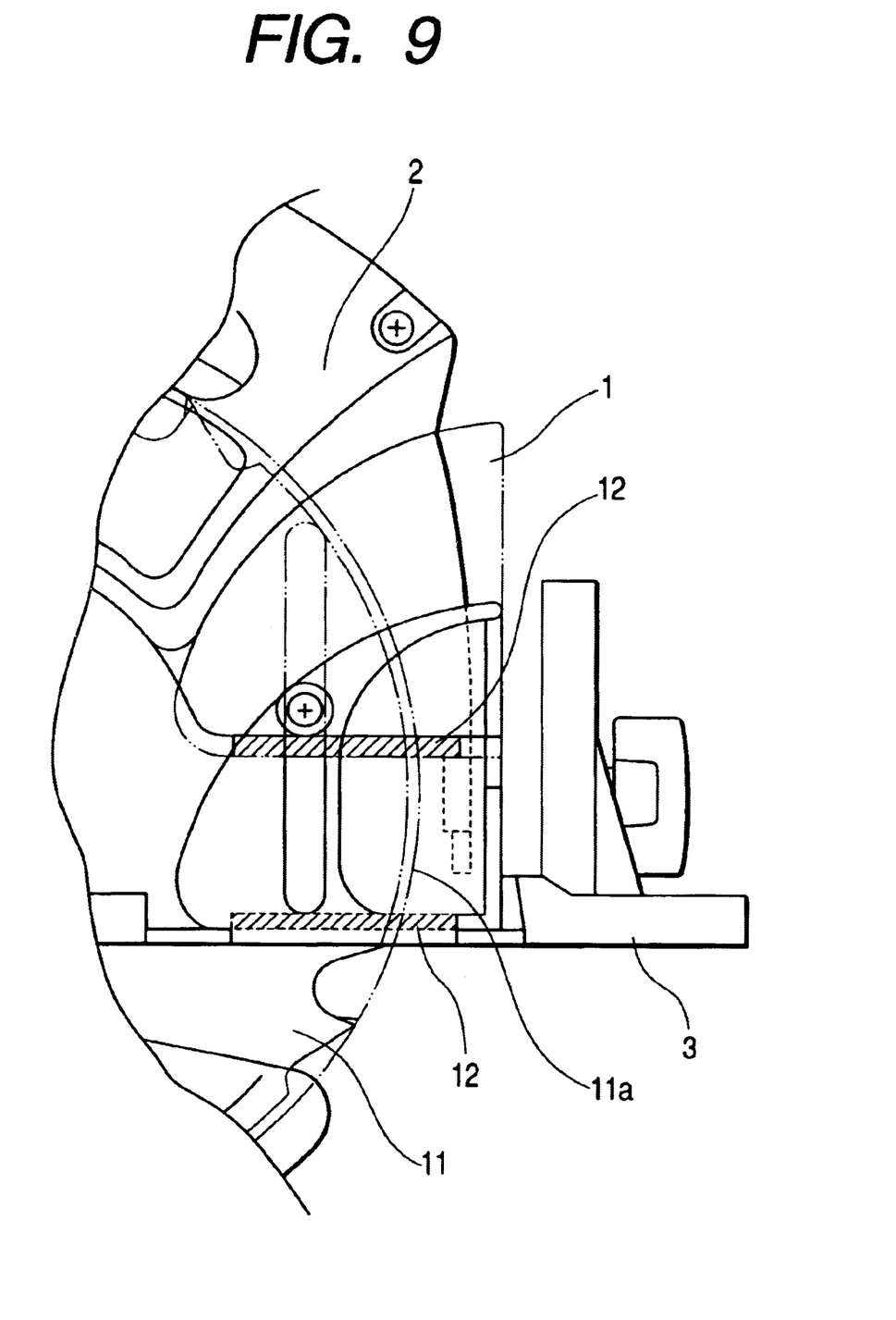
FIG. 9 is a front view of a portion of the portable circular saw in FIG. 6.

As shown in FIGS. 7, 8, and 9, the lower end of an inner portion of the slide cover 1 has a flange-like projection (an inner projection) 12 extending along a direction toward the saw blade 11. In FIG. 9, regardless of the position of the slide cover 1 between its uppermost position and the lowermost position, a plane including a lower surface of the inner projection 12 covers a range through which the outer circumference 11a of the saw blade 11 extends. Thus, in FIG. 9, the plane including the lower surface of the inner projection 12 meets or extends across the outer circumference 111a 20 of the saw blade 11. As shown in FIG. 7, the inner projection 12 protrudes from an inner surface of the wall of the saw-blade cover 2 toward the saw blade 11. When the slider cover 1 is in its lowermost position or its uppermost position, the inner projection 12 defines a part of the chips-inflow portion in the saw-blade cover 2. Therefore, when the slide cover 1 is in its lowermost position or its uppermost position, the inner projection 12 causes a reduction in the cross-sectional area of the chips-inflow portion. Accordingly, the inner projection 12 enables chips to flow faster and smoother in the saw-blade cover 2 toward the outlet 13.

With reference to FIG. 7, the slide cover 1 can be moved upward until the inner projection 12 on the slide cover 1 meets a lower end 13A of the saw-blade cover 2. Thus, the lower end 13A of the saw-blade cover 2 serves as a stopper for limiting upward movement of the slide cover 1. In addition the lower end 13A of the saw-blade cover 2 defines the uppermost position of the slide cover 1.

As previously mentioned, the inner projection 12 is provided on the lower end of the slide cover 1. In FIG. 6, the inner projection 12 (see FIGS. 7, 8, and 9) is located above the point P of intersection between the outer circumference of the saw blade 11 and the plane including the lower surface of the base 3 even when the slide cover 1 is in its lowermost position. In FIG. 6, regardless of the position of the slide cover 1 between its uppermost position and the lowermost position, the plane including the lower surface of the inner projection 12 (see FIGS. 7, 8, and 9) covers a range through which the tangent B passes. Thus, in FIG. 6, the plane including the lower surface of the inner projection 12 (see FIGS. 7, 8, and 9) meets or extends across the tangent B. The inner projection 12 extends along a direction roughly similar to the direction of the line C perpendicular to the tangent B. The inner projection 12 has a front portion as viewed in the cutting direction. Preferably, the inner projection 12 has a shape such that when the slide cover 1 is in its uppermost position, the front portion thereof is positioned relative to the line C in the direction D (see FIG. 6) away from the base 3. Preferably, the inner projection 12 extends substantially in parallel with the longitudinal direction of the base 3. Thus, the inner projection 12 extends in a direction inclined relative to the line C at a given offset angle.

As best shown in FIG. 4, the saw-blade cover 2 has an opening 2b. The opening 2b enables the saw blade 11 to be replaced with a new one without removing the saw-blade cover 2.

Second Embodiment

A second embodiment of this invention is modified from the first embodiment thereof so that a projection similar in structure and function to the projection 10 is provided on the saw-blade cover 2 rather than the slide cover 1.

Third Embodiment

A third embodiment of this invention is similar to the first embodiment thereof except for design changes mentioned later.

Figure 10:
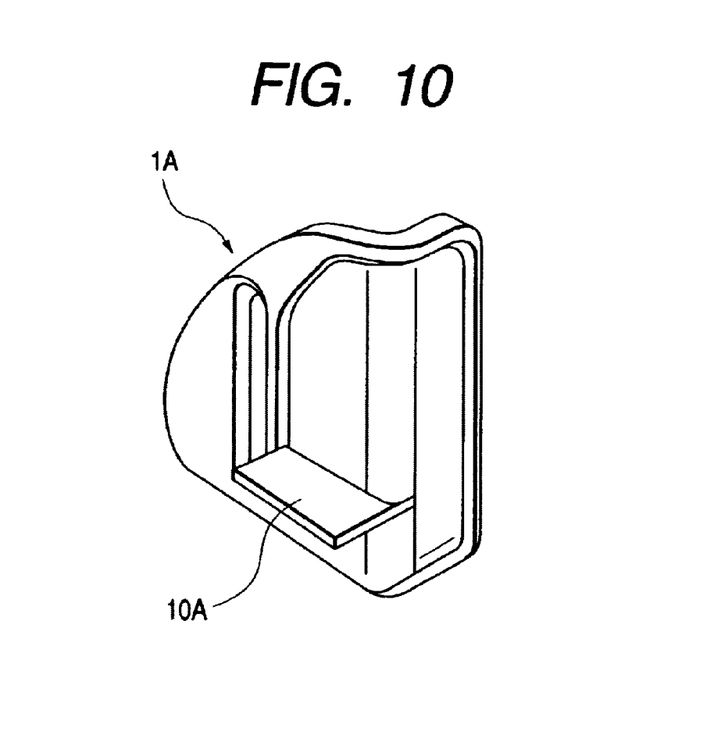
FIG. 10 is a perspective view of a slide cover in a third embodiment of this invention.

FIG. 10 shows a slide cover 1A in the third embodiment of this invention. The slide cover 1A replaces the slide cover 1 (see FIGS. 4–9). The slide cover 1A has a flange-like projection (an outer projection) 10A at its intermediate portion. In other points, the slide cover 1A is similar to the slide cover 1. The outer projection 10A corresponds to the outer projection 10 of the slide cover 1 (see FIGS. 4–9).

Fourth Embodiment

A fourth embodiment of this invention is similar to the first embodiment thereof except for design changes mentioned later.

Figure 11:
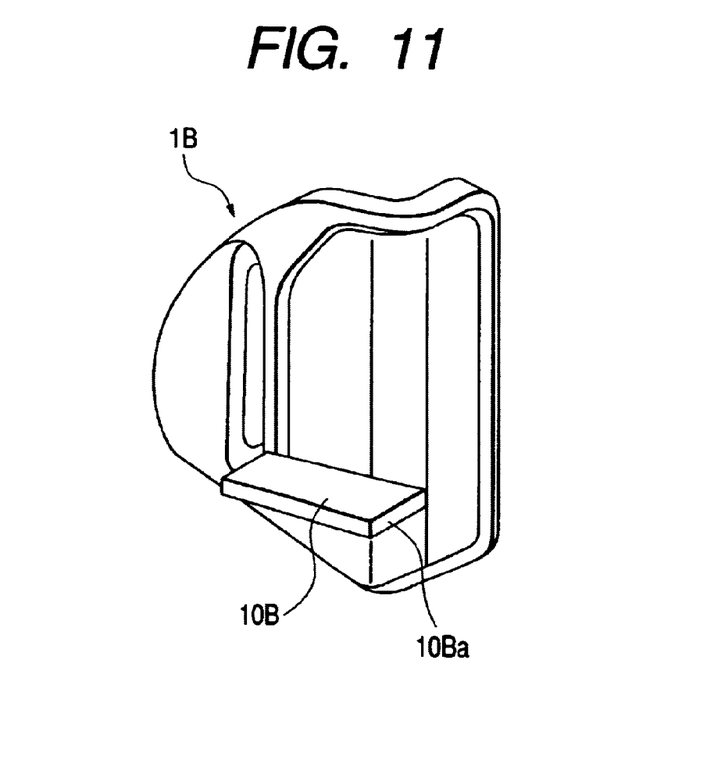
FIG. 11 is a perspective view of a slide cover in a fourth embodiment of this invention.

FIG. 11 shows a slide cover 1B in the fourth embodiment of this invention. The slide cover 11B replaces the slide cover 1 (see FIGS. 4–9). The slide cover 1B has a flange-like projection (an outer projection) 10B at its intermediate portion. In other points, the slide cover 1B is similar to the slide cover 1. The outer projection 10B corresponds to the outer projection 10 of the slide cover 1 (see FIGS. 4–9).

The outer projection 10B extends in a direction inclined relative to the base 3 (see FIGS. 4, 6, and 7). The outer projection 10B is located above the point P of intersection between the outer circumference of the saw blade 11 (see FIGS. 4, 6, and 7) and the plane including the lower surface of the base 3 even when the slide cover 1B is in its lowermost position. Regardless of the position of the slide cover 1B between its uppermost position and the lowermost position, a plane including a lower surface of the outer projection 10B covers a range through which the tangent B passes (as viewed in FIG. 6). Thus, the plane including the lower surface of the outer projection 10B meets or extends across the tangent B (as viewed in FIG. 6). The outer projection 10B has a front portion 10Ba as viewed in a cutting direction. The outer projection 10B has a shape such that the front portion 10a is positioned relative to the line C (perpendicular to the tangent B) in the direction D (see FIG. 6) away from the base 3.

What is claimed is:

1. A portable circular saw comprising:

a base;

a saw blade having a portion projecting downward from the base;

a saw-blade cover concealing at least a part of the saw blade; and a projection provided on the saw-blade cover and protruding in a direction away from the saw blade, wherein the projection has a lower surface extending across a first plane which is parallel to an axis of rotation of the saw blade, and which contains a tangent to an outer circumference of the saw-blade at a point of intersection with a second plane including a lower surface of the base, and wherein chips fly from the point of intersection along a direction in the first plane, and the lower surface of the projection inclines relative to a line perpendicular to the tangent so as to change a path of a portion of flow of the chips toward a forward side as viewed in a cutting direction.

2. A portable circular saw comprising:

a base;

a saw blade having a portion projecting downward from the base;

a saw-blade cover concealing at least a part of the saw blade;

a movable slide cover provided on the saw-blade cover, and blocking and unblocking an opening between a front lower end of the saw-blade cover and an upper surface of the base in accordance with upward and downward movement thereof; and a projection provided on the slide cover and protruding in a direction away from the saw blade, wherein the projection has a lower surface extending across a first plane which is parallel to an axis of rotation of the saw blade, and which contains a tangent to an outer circumference of the saw-blade at a point of intersection with a second plane including a lower surface of the base, and wherein chips fly from the point of intersection along a direction in the first plane, and the lower surface of the projection inclines relative to a line perpendicular to the tangent so as to change a path of a portion of flow of the chips toward a forward side as viewed in a cutting direction.

3. A portable circular saw as recited in claim 2, wherein when the slide cover is in its uppermost position, the projection protrudes from a line connecting a cutting point on the saw blade and a side surface portion of the saw-blade cover in a direction away from the saw blade.

4. A portable circular saw as recited in claim 2, wherein the slide cover is transparent.

5. A portable circular saw as recited in claim 2, wherein the projection extends substantially in parallel with a longitudinal direction of the base.

6. A portable circular saw as recited in claim 2, wherein the projection is provided on a lower end of the slide cover.

7. A portable circular saw as recited in claim 2, wherein a plane including a lower surface of the projection extends across the outer circumference of the saw blade.

8. A portable circular saw comprising:

a base;

a saw blade having a portion projecting downward from the base;

a saw-blade cover concealing at least a part of the saw blade;

a movable slide cover provided on the saw-blade cover, and blocking and unblocking an opening between a front lower end of the saw-blade cover and an upper surface of the base in accordance with upward and downward movement thereof; and a projection provided on and extending inside the slide cover, the projection protruding toward the saw blade.

9. A portable circular saw as recited in claim 8, wherein a plane including a lower surface of the projection meets an outer circumference of the saw blade.

10. A portable circular saw as recited in claim 8, wherein the slide cover assumes its uppermost position when the projection contacts a lower end of the saw-blade cover.

11. A portable circular saw comprising:

a saw blade;

a saw-blade cover concealing at least a part of the saw blade;

a moveable slide cover provided on the saw-blade cover; and a flange-shape inner projection provided on the slide cover to reduce an effective cross-sectional area of a path for a flow of chips in the saw-blade cover.

* * * * *